April 30, 1935.  J. L. ANDERSON  1,999,854
METHOD OF WELDING
Filed March 28, 1933
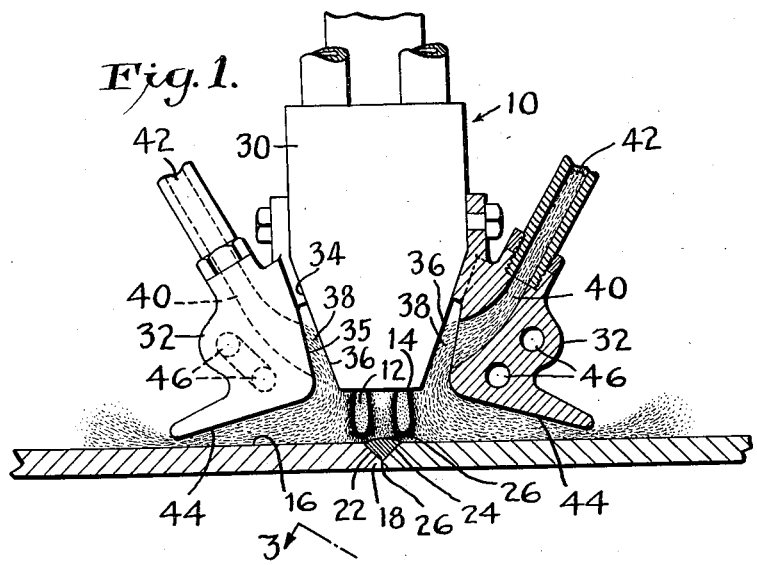
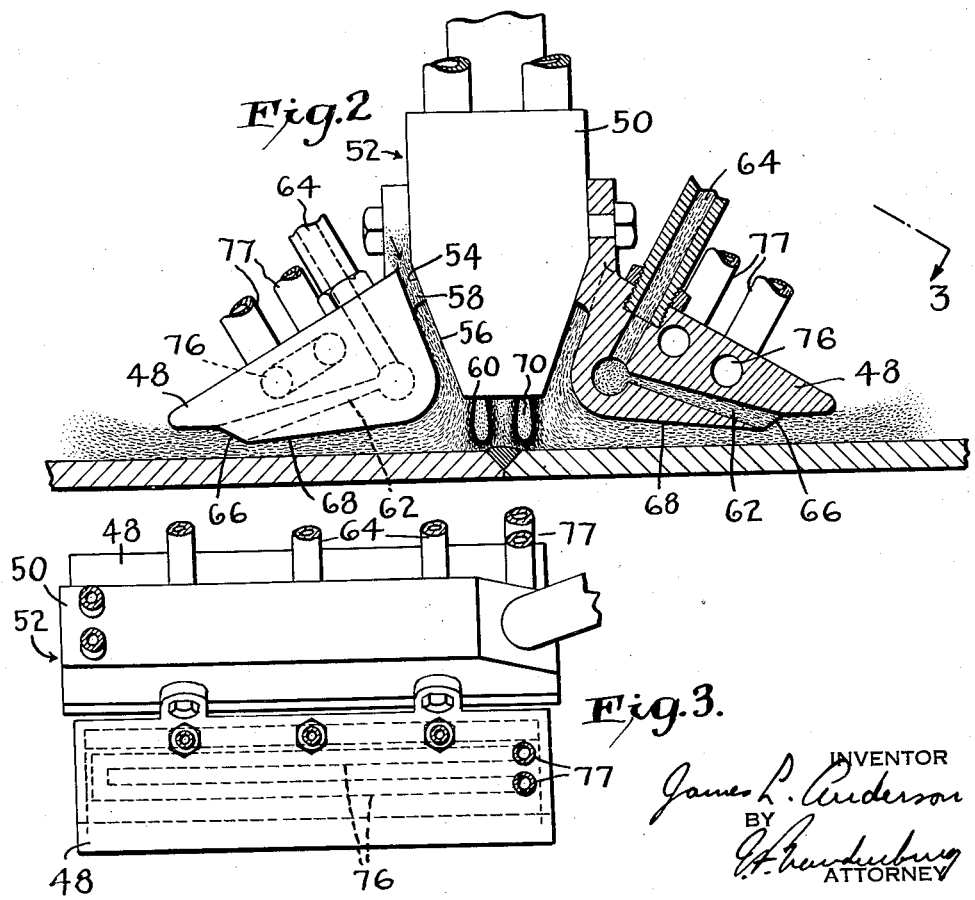
INVENTOR
James L. Anderson
BY
ATTORNEY Patented Apr. 30, 1935

1,999,854

UNITED STATES PATENT OFFICE 1,999,854

METHOD OF WELDING

James L. Anderson, Closter, N. J., assignor to Air Reduction Company, Incorporated, New York, N. Y., a corporation of New York Application March 28, 1933, Serial No. 663,122

15 Claims. (Cl. 113—112)

This invention relates to a method of welding in which the combustion reaction of envelope gases is utilized to assist in heating the metal which is being welded.

During the combustion of fuel gases, such as acetylene, which are used in the so-called "gas welding" devices, a number of stages are passed through before the gases are dissipated in completely burned condition. In the case of acetylene, at least two stages of combustion have been noted, namely, a primary stage in which the oxygen attacks the acetylene to break it down to carbon monoxide and hydrogen, and a secondary stage, in which either by pure oxygen from the burner or diluted oxygen from the air the hydrogen and carbon monoxide are converted into water vapor and carbon dioxide.

The supply of oxygen for the secondary stage is seldom introduced through the burner because this additional oxygen produces an oxidizing flame in the first stage, and this additional oxygen increases the cost of the weld. According to common practice in oxyacetylene welding, the torch burner is supplied with a mixture of oxygen and acetylene in which the quantity of oxygen is much less than sufficient for the complete combustion of the acetylene and the oxygen necessary to burn the envelope gases in the second stage of the combustion is supplied by the atmosphere.

The temperature in the first stage is close to the highest temperature now obtainable by man and the point at which this stage of the reaction is completed in the flame jet has long been recognized as an efficient means for quickly and effectively fusing metal. This point is quite concentrated in its location; however, the gases resulting from the reaction at this point are of considerable volume, the actual reaction increasing by fifty per cent. the volume of the gas, while expansion, due to change of pressure from that at which the gases are delivered and due to the temperature of the flame jets, accounts for an increase in volume of approximately one hundred per cent.

These great volumes of gas, which are combustible, tend to rise and move rapidly away from the scene of the melting metal and in normal operation their heat content and the heat derivable from their combustion are very largely lost in so far as assistance in bringing the metal at the weld region to fusing temperature is concerned. One of the great problems in welding by oxy-fuel gas devices, and especially where such devices are made part of a "mechanical" welding system, involves the utilization in some manner of the heat which can be realized from the combustion of these gases, generally known as the hydrogen envelope gases. It is, of course, desirable that the heat derivable from these gases be taken advantage of in the immediate operation, that is, that the heat content of the gases while still hot from the combustion of the acetylene to carbon monoxide and hydrogen, may be applied as much as possible to heating the metal to be welded to a degree much higher than its normally cold condition, and as near as possible to the temperature of fusion, so that the oxy-fuel gas jets themselves which, under such circumstances, would by their direct action be required to impart to the metal but a portion of the total heat necessary for melting the metal, would become more effective and speedier in the operation of fusing the metal, with a resultant decrease in the number or size of jets necessary for a given operation, or an increase in the speed of welding for a given number and size of jets.

Then, also, where the burner tip must be positioned between a set of clamps which are used to retain in position the metal to be welded, it has been found that, due to the constriction of the space between burner face, the clamp face and the jets, an insufficiency of atmospheric oxygen necessary for completion of the second stage of the combustion reaches the jets, and results in some cases in extinguishing some of the jets by their envelope gases.

It is an object of this invention to provide an oxy-fuel gas welding method in which atmospheric oxygen or similar oxidizing gas is directed toward the flame system in such manner that the combustion is unhampered and uninterrupted, and so that complete combustion of the gases through all the stages thereof is effected near the surface of the work. Such a method effects the heating of the solid metal, in proximity to the portions to be welded, to a much higher temperature than is ordinarily obtained during combustion of such gases, with consequent lessening of the conduction losses from the welded portions.

Combustion close to the source of the flame system and along the surface of the work also results in reduction of distress to the welder from the ordinarily long backward flowing envelope flames, and reduction in the effects upon the apparatus of the gases which would ordinarily burn up around the body of the tip or torch, with consequent increase in general efficiency.

The method of this invention can be practised with a torch having means whereby air is inspirated or driven positively past the high temperature flame system to support combustion of the envelope gases, and the burning envelope gases constrained to bring them into direct and effective heating relation with the surface of the metal against which the flame system is directed. Such constrained flow of these gases, which are in effect reducing gases, results in maintaining immediately over the highly heated metal a reducing atmosphere which will continuously be effective to prevent oxidation of such highly heated metal. Combustion of the envelope gases at and over the surface insures very effective heat interchange between gas and metal.

During welding, slag or oxide particles are usually discharged upwardly toward, and impinge against, the face of the burner tip. This occurs especially in the neighborhood where the metal is in the critical condition of fusion. Stoppage of jets by the flying particles is detrimental to the welding operation, as is well known. The methods involved in this invention produce a flow of gas in such direction as to counteract to a great degree the forces creating the flying particles and also tends to deviate any such flying particles from flight toward the burner face.

Other objects, features and advantages of the invention will appear or be pointed out as the specification proceeds.

In the accompanying drawing, forming part hereof:

Fig. 1 is an end view, partly in section, of a welding burner modified for welding in accordance with the method of this invention;

Fig. 2 is a view similar to Fig. 1, illustrating a different deflector construction for welding by the method of this invention; and Fig. 3 is a view on a reduced scale taken on the line 3—3 of Fig. 2.

The apparatus illustrated in the drawing is the subject-matter of my copending application Serial No. 527,031, filed April 1, 1931, of which this application is a division.

In Fig. 1 a torch tip 10 conforms closely with a construction shown in my Patent 1,516,486, dated November 25, 1925. It is, however, to be understood that the invention may be used with any burner tip of the type used in welding operations wherein the production of hot gases is a part of the process.

The invention is especially applicable to the progressive welding of seams formed by bringing substantially into edge to edge abutting relation sheet or plate members, or by bending sheet or plate metal into tubular or helical form so that a seam, extending either in a straight line or helically and longitudinally of the pipe or tube member is thus formed. In such processes, relative motion of the seam edges past the burner tip, or the burner tip along the seam edges, is effected.

In burners such as shown at 10, a plurality of jets 12 are directed from an orifice face 14 against the surface 16 of the seam margins 18 and 20, the edges 22 and 24 of which are positioned substantially in abutment to form seam 26. The orifices for the jets are spaced longitudinally of the face to form one or more files of jets, which may be arranged to impinge upon margin metal, closely adjacent the edges, in the manner set forth in said patent. In the neighborhood at which it is desired that fusion of the metal occur, as at 28, the spacing of the jets may be decreased to assure a proper heat concentration for fusing the metal of the seam edges until proper commingling results.

To produce the flame jets 12, a mixture of oxygen, preferably in a highly purified condition, and a fuel gas, such as acetylene, is fed to the orifices and there ignited. It has been found in the past that, due to insufficient oxygen supplied with the fuel gas to the jets and the lack of atmospheric oxygen brought into association with the combustible, but non-combustion supporting, gases around the tip, some, or even all, of the flame jets may be extinguished, in the latter case, with consequent cessation of the welding operation, a condition which is undesirable, due to defects, such as lack of penetration, arising from sudden changes of temperature, and for like reasons.

For the purpose of eliminating such possibilities and also to effect other results herein set forth, the construction of the tip 10 has been modified, as shown, by associating with the body 30 a pair of longitudinally extending deflectors 32, which are attached to or formed with the sides of the body 30 in any desired manner. The portions of the deflectors and of the burner tip body which are in contact at 34 close the tops of the passages 38 formed at the sides of the tip body between the spaced and preferably divergent faces 35 and 36 of the deflectors and the body.

Conduits 40 are formed in the deflectors and open toward faces 36 and into passages 38 at intervals. By means of such conduits, air or similar oxidizing gas forced into the conduits from some external source, as through the supply ducts 42, will be passed down along faces 36 and brought directly into contact with the hydrogen envelope gases formed at jets 12. The bottom face 44 of each of the deflectors is formed as a substantially continuous surface having a downward slope away from face 35 and toward the surface 16 of the work.

Gases coming through passages 38 and uniting with the burning envelope gases adjacent orifice face 14 will be compelled to flow close to the surface 16 of the work, thus causing the gases to give up a portion of their heat to the metal in close adjacency to the welding region, and to continue to give up heat to the metal as they flow laterally over the surface of the work away from the seam. In addition to the preheating action arising from the application of such heat adjacent the seam region, there is the benefit of a wall of hot metal built up for a considerable distance away from the seam edges and acting to reduce the temperature difference between the region of fusion and the neighboring and more outlying solid metal. In ordinary practice the sharp temperature gradient away from the seam being welded robs the seam edges of much heat put into them by the jets 12, the envelope gases contributing but little heat to oppose this loss by conduction through the metal. In the present invention the envelope gases are so confined and directed that they give direct aid to the jets and further aid by establishing a broad hot zone in the metal.

Since the faces 35 and 44 of the deflectors 32 are subjected to the action of the burning hydrogen envelope gases, means for cooling the deflector bodies is necessary and is provided for by forming these bodies with passages 46 through which water, or a similar cooling fluid, is circulated.

In Fig. 2 a modified construction is illustrated; in this construction, however, the deflectors 48 are formed and are assembled at 54 on the body 50 of the torch tip 52 in such manner that a plurality of entrances 58 from the surrounding atmosphere open into the tops of the passages between the deflectors and the sides of the burner tip, these passages extending downward to the level of the orifice face 60 from which the high temperature jets 70 are delivered. As in the other form, these passages turn outward in communication with the lateral passages formed between the face of the work metal and the bottom faces 68 of the deflectors, these bottom faces converging toward the surface of the work.

Through the deflectors 48 are formed passages 62, which are connected to supply ducts 64 leading from a source of air under pressure. Through these conduits air, or any other suitable oxidizing gas, is driven and is delivered through one or more mouths 66 at the under and outer lateral portions of the deflectors. The bottom face 68 of each deflector, and the face thereof opposed to the side face 56 of the tip body, confine and deflect the gases as in Fig. 1, with the difference that the flow of the envelope gases and of air entrained through the entrances 58 is an induced flow and that air is introduced to the combustible envelope gases in two stages. Water cooling passages 76 in the deflectors are connected with conduits 77 through which water is led to and from the cooling passages.

In both forms of the invention the heat of the burning envelope gases is confined closely to the surface of the work metal by the manner in which the flow is directed by the deflectors, and the area of heating by these gases is fairly wide. In the form illustrated in Fig. 2 the useful heat surrendered by the envelope gases is extended over the surface of the work to a somewhat greater distance than in the form of Fig. 1.

It is possible also to direct the orifices in such manner that movement of the burning gases will be in the direction in which the jets are moving relatively to the surface of the seam margins, and thus to force the envelope gases to move and burn adjacent the work metal in advance of the welding jets. In this manner, direct preheating of the metal in advance of the action thereon of the welding jets is accomplished.

In the spaces or passages formed between the deflectors, the tip body, and the work metal, there is a commingling of the envelope gases with air accompanied by combustion in the mixture, but the commingling in these regions is not complete and the relations are such that a bottom stratum of envelope gases constantly sweeps in contact with the highly heated metal and by its reducing action protects the metal from oxidation. As the air and the envelope gases proceed farther from the seam and from the high temperature jets from which the envelope gases are released, and when they are eventually discharged beyond the deflectors, still flowing substantially parallel with the surface of the work, the commingling and burning of the gases with air continue until as much as possible of the heat of the gases has been put into the metal.

The direction given to the envelope gases, augmented by air, so that a flow is produced away from the jets and substantially parallel with the surface of the work, minimizes the possibility of particles of slag striking back into the jet orifices and obstructing them.

The invention can be carried out with apparatus other than that illustrated and described, and various features of the invention can be used alone or in combination with other features without departing from the invention as defined in the claims.

I claim:

1. In the progressive welding of metal edges, the method which comprises producing continuous relative movement between a high-temperature flame system and the edges to be welded, with the flame system extending in the direction of said movement, supplying said flame system with a mixture of oxygen and fuel gas in which the quantity of oxygen is much less than sufficient for complete combustion of the fuel gas, furnishing another supply of combustion-supporting gas to the combustible envelope gases emanating from the high-temperature flame system, and confining and guiding the envelope gases across the surface of the metal during their combustion reaction with said combustion-supporting gas.

2. A method of progressively welding a seam between metal parts, which comprises applying a seamwise-extended set of high-temperature flame jets delivered in a plurality of transversely spaced lines or rows to heat and fuse the portions to be united, while producing continuous relative movement between the jets and the seam, supplying said flame jets with a mixture of oxygen and fuel gas in which the quantity of oxygen is much less than sufficient for complete combustion of the fuel gas, furnishing another supply of combustion-supporting gas to the combustible envelope gases emanating from the numerous high-temperature jets so as to insure adequate access of oxygen to the envelope gases surrounding the closely disposed jets, and confining and guiding the envelope gases across the surface of the metal during their combustion reaction with said combustion-supporting gas.

3. A method of progressively welding a seam between metal parts, which comprises applying a seamwise-extended system of high-temperature flame to heat and fuse the portions to be united, while producing continuous relative movement between the flame system and the seam, supplying said flame system with a mixture of oxygen and fuel gas in which the quantity of oxygen is much less than sufficient for complete combustion of the fuel gas, directing currents of air to burn the combustible envelope gases emanating from the high-temperature flame system, and confining and guiding the envelope gases across the surface of the metal during their combustion reaction with the oxygen in said air.

4. In the progressive welding of metal edges, the method which comprises producing continuous relative movement between a high-temperature flame system and the edges to be welded, with the flame system extending in the direction of said movement for sufficient distance to heat and fuse the edges, supplying said flame system with a mixture of oxygen and fuel gas in which the quantity of oxygen is much less than sufficient for complete combustion of the fuel gas, delivering additional streams of compressed combustion-supporting gas into contact with the envelope gases in the vicinity of the edges, and confining the mixture of envelope gases and combustion-supporting gas close to the surface of the metal as it moves away from the edges.

5. A method of progressively welding a seam between metal parts, which comprises applying a seamwise-extended set of high-temperature flame jets to heat and fuse the portions to be united, while producing continuous relative movement between the jets and the seam, supplying said flame jets with a pre-formed oxyacetylene mixture yielding carbon monoxide and hydrogen as envelope gases going out from the high-temperature jets, delivering additional streams of combustion-supporting gas to maintain combustion of these envelope gases in the vicinity of the closely spaced jets, and confining and guiding the burning envelope gases across the surface of the metal during their reaction with the combustion-supporting gas.

6. A method of progressively welding a seam between metal parts, which comprises applying a seamwise-extended system of high-temperature flame to heat and fuse the edges to be united, while producing continuous relative movement between the flame system and said edges, supplying said flame system with a pre-formed oxy-acetylene mixture yielding carbon monoxide and hydrogen as envelope gases going out from the high-temperature flame system, separately introducing combustion-supporting gas to burn these envelope gases, and confining the mixture of envelope gases and combustion supporting gas so that they burn close to the edges and assist the heating of said edges while protecting them from oxidation.

7. A method of progressively welding a seam between metal parts, which comprises applying a seamwise-extended system of high-temperature flame to heat and fuse the portions to be united, while producing continuous relative movement between the flame system and the seam, supplying said flame system with a pre-formed oxyacetylene mixture yielding carbon monoxide and hydrogen as envelope gases and air going out from the high-temperature flame system, delivering air blasts in the vicinity of the flame system to maintain the combustion of these envelope gases as they issue from the flame system, and confining and guiding the burning mixture of envelope gases across the surface of the work.

8. A method of progressively welding a seam between metal parts, which comprises applying a seamwise-extended system of high-temperature flame to heat and fuse the portions to be united, while producing contiuous relative movement between the flame system and the seam, supplying said flame system with a mixture of oxygen and fuel gas in which the quantity of oxygen is much less than sufficient for complete combustion of the fuel gas, supplying streams of combustion-supporting gas to contact with the issuing envelope gases, and confining and guiding the burning envelope gases and combustion-supporting gas over the surface of the parts being welded in the general direction contrary to the direction of movement of the seam relative to the flame system, so that the heat liberated by these gases is effectively utilized for preheating of the metal to be welded.

9. A method of progressively welding a seam between metal parts, which comprises applying a seamwise-extended system of high-temperature flame to heat and fuse the. portions to be united, while producing continuous relative movement between the flame system and the seam, supplying said flame system with a mixture of oxygen and fuel gas in which the quantity of oxygen is much less than sufficient for complete combustion of the fuel gas, supplying streams of combustion-supporting gas, directing these streams downward at the sides of the seamwise-extended system of high-temperature flame to mingle with the envelope gases and promote their combustion, and confining and guiding the combustion-supporting gas and burning envelope gases across the surface of the parts being welded.

10. A method of progressively welding a seam between metal parts, which comprises applying a seamwise-extended system of high-temperature flame to heat and fuse the portions to be united, while producing continuous relative movement between the flame system and the seam, supplying said flame system with a mixture of oxygen and fuel gas in which the quantity of oxygen is much less than sufficient for complete combustion of the fuel gas, causing air currents to flow toward the flame system so as to burn the envelope gases emanating therefrom and to minimize the building up of slag and oxide on the surfaces from which the flame system is delivered, and confining and guiding the air and gases across the surface of the metal as they move away from the seam.

11. The method of welding which comprises causing relative movement between the metal to be welded and a source of welding heat surrounded by an envelope gas, causing a separate stream of gas to mix with the envelope gas as the latter moves away from the source of welding heat, the gas of said separate stream being capable of entering into combustion reaction with the envelope gas, and confining and guiding the mixture of gases across the surface of the metal during the combustion reaction.

12. The method of welding which comprises causing relative movement between the metal to be welded and a source of welding heat surrounded by an envelope gas, discharging a stream of compressed gas in a direction to cause an induced flow of air into contact with the envelope gas to mix with and support combustion of said envelope gas as it moves away from the source of welding heat, and confining and guiding the mixture of gases across the surface of the metal during the combustion reaction.

13. In a process of welding metallic portions, in which a high temperature is created in such portions to fuse their edges and during the creation of such high temperature there is a body of combustible gas adjacent to said portions, the steps of producing a flow of an oxidizing gas into reactive relation with such combustible gas, and confining such gases while in reactive relation close to the surface of said metallic portions adjacent the edges so that the combustible gas protects the hot metal from oxidation.

14. In a process of welding metallic portions, in which a high temperature is created in such portions and during the creation of such high temperature a body of combustible gas exists adjacent to the portions to be welded, the steps of producing a flow of an oxidizing gas into reactive relation with such combustible gas, and guiding such gas while in reactive relation immediately over the surface of said portions and away from the point of creation of such high temperature.

15. In the progressive welding of metal edges, the method which comprises producing continuous relative movement between a high-temperature flame system and the edges to be welded, with the flame system extending in the direction of said movement for sufficient distance to heat the edges of the metal to a welding temperature while they pass the length of said flame system at a given speed, supplying the flame system with a mixture of oxygen and fuel gas which burns with a primary intense heating flame and produces combustible envelope gases around the primary flame, confining the envelope gases close to the edges of the metal, and causing oxygen to be supplied to the envelope gases so that they burn while so confined and assist in the heating of the edges of the metal, and protect said edges from oxidation.

JAMES L. ANDERSON.